WRIGHT & PENNY.
Corn Planter.

No. 78,171.  Patented May 19, 1868.

United States Patent Office.

JACOB J. WRIGHT AND JOHN H. PENNY, OF HARRISON, OHIO.

Letters Patent No. 78,171, dated May 19, 1868.

IMPROVEMENT IN CORN-PLANTERS.

*The Schedule referred to in these Letters Patent and making part of the same.*

TO ALL WHOM IT MAY CONCERN:

Be it known that we, JACOB J. WRIGHT and JOHN H. PENNY, both of Harrison, Hamilton county, State of Ohio, have invented certain new and useful Improvements in Corn-Planters; and we do hereby declare the following to be a full, clear, and exact description thereof, reference being had to the accompanying drawings, making part of this specification.

Our invention relates to that class of corn-planters in which the seed-dropping mechanism is operated by one of the wheels of the machine, and consists of peculiarly-constructed and arranged flexible connections between the plough, covering-shares, and seed-box, and also in a device for pushing out the seed from the seed-apertures as the latter are brought directly over the seed-conveying-tube.

In the accompanying drawings—

Figure 1:
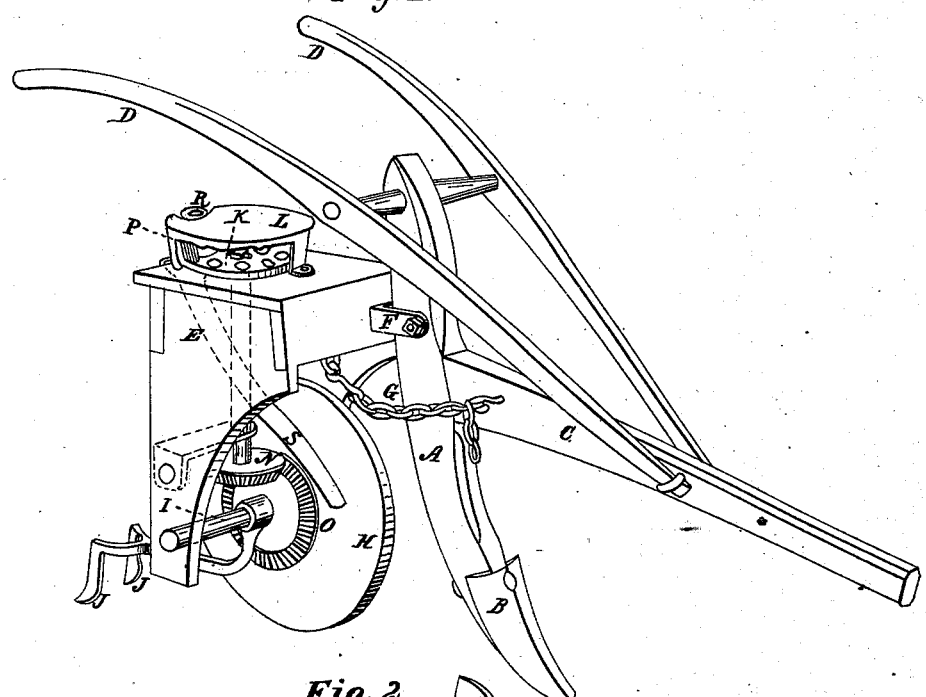
Figure 1 is a perspective view of a corn-planter embodying our invention.
Figure 2:
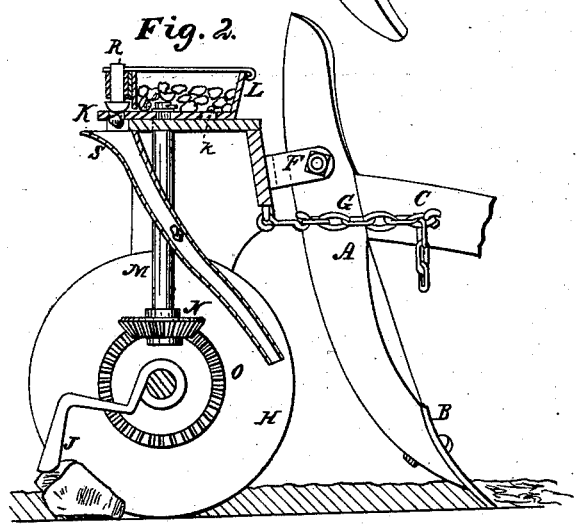
Figure 2 is a vertical longitudinal section of the same.

The ploughing part of our invention consists of the ordinary sheth A, share B, beam C, and handles D. It is connected to the seed-box E by hinge-joint F, and can be adjusted so as to be rigid, in the direction of the pull, by means of the chain G. The seed-box E is supported on the wheel H, which is located in such a position on its shaft I that it will run in the furrow made by the share B. The covering-shares J are loosely hung to the shaft I in such a manner that while they are kept to the ground by gravitation, they are capable of lifting up in passing over large stones or other obstructions, as exhibited in fig. 2. The seed-distributing plate K is located in the bottom of the hopper L, and is rotated by means of shaft M and gear-wheels N O. P is an ordinary seed-planter brush, for clearing off superfluous seeds from the apertures $k$. A gravitating, round-headed plug, R, is fitted into a suitable socket in the hopper L. The plug is adapted to ride in a jolting manner over the apertures, in their rotation, and by partially dropping into each aperture shake out the grains of seed immediately over the seed-tube S.

The mobility and adjustment of the plough with relation to the seed-box afford means for varying the depth of furrow.

We claim herein as new, and of our invention—

1. The hinge-joint F and adjusting-chain G, when used in combination as a means of giving mobility and adjustment to the plough and seed-box for the purpose specified.

2. The covering-shares J, when swivelling on or near the axle of the ground-wheel or wheels as described, and for the purpose specified.

3. The gravitating round-headed plug R, for the purpose described.

In testimony of which invention, we hereunto set our hands.

JACOB J. WRIGHT,
JOHN H. PENNY.

Witnesses:
GEO. H. KNIGHT,
JAMES H. LAYMAN.